Patented Aug. 26, 1941

2,253,723

UNITED STATES PATENT OFFICE 2,253,723

PRODUCTION OF ETHERS

Leonard P. Moore, Stamford, Conn., assignor to American Cyanamid Company, New York, N. Y., a corporation of Maine No Drawing. Application March 9, 1939, Serial No. 260,778

2 Claims. (Cl. 260—615)

This invention relates to the preparation of various ethers by the reaction of an alkylene oxide with an organic compound containing one or more hydroxyl groups.

One object of this invention is to devise an improved catalytic process for the preparation of ethers from alkylene oxides and alcohols. Another object of this invention is to provide an efficient catalyst for the reaction of alkylene oxides with alcohols or other hydroxyl compounds.

These and other objects are attained by reacting an alkylene oxide with an organic hydroxyl compound such as an alcohol in the presence of stannic chloride as a catalyst. Preferably anhydrous stannic chloride is used.

The following examples, in which the proportions are given in parts by weight, are given by way of example and not in limitation.

Example 1

100 parts of glycerol containing 1% stannic chloride are heated to 125°–140° C. and ethylene oxide is bubbled through the glycerol for about sixteen hours at which time about 84 parts of ethylene oxide will have combined. The resulting product is an ether mixture which has an average molecular weight of about 167.0 as calculated from a determination of the hydroxyl groups.

Example 2

2000 parts of triethylene glycol and 22 parts of stannic chloride are placed in a suitable reaction chamber provided with an agitator and surrounded by a heat transfer bath. The reaction temperature is maintained at about 25°–35° C. and ethylene oxide is added slowly. It requires about five hours to add about 1714 parts of ethylene oxide. After the addition of the ethylene oxide the temperature is gradually raised to about 45° C. and held for sufficient time to complete the reaction, e. g. one-half hour. The average molecular weight of the mixture of glycol ethers as calculated by determination of the hydroxyl value is about 320. While the product is light brown, this color is apparently due to the catalyst.

Example 3

A product made according to Example 2 is fractionally distilled to give the following fractions.

Example 4

A product made according to Example 2 is diluted with from about one-fourth to about an equal volume of water. The mixture is then allowed to stand until the catalyst has precipitated (e. g. about twelve hours) in the form of flocculent tin hydroxide. Decolorizing carbon may be added if desired and then the mixture is filtered. The completeness of the precipitation may be tested by passing hydrogen sulfide into a small sample of the filtrate. If no precipitate be formed, the precipitation with water is complete.

The clear filtrate is warmed on a steam bath and a vacuum applied to remove the water present. The product is clear yellow and has an average molecular weight of about 268.

Example 5

Example 2 is repeated except that a higher reaction temperature is used, e. g. about 45° C. (±5°). In this way about 2200 parts of the ethylene oxide react with the glycol. The yellow product is treated with water to precipitate the catalyst, a filter aid added, filtered and dried, substantially as described in Example 4. Air may be bubbled through the mixture during the removal of water and the resulting product is almost water white. The average molecular weight of the polyethylene glycol mixture is about 278.

Example 6

2000 parts of glycerine and 15 parts of stannic chloride are heated to about 125°–130° C. and ethylene oxide gas bubbled through at such a rate that substantially no unreacted ethylene oxide escapes. This is continued for 150–160 hours after which time about 3750 parts of ethylene oxide will have reacted. The product is light brown and very viscous. The catalyst is removed in the manner described in Example 4. Hydrogen sulfide may be bubbled through the product to assist in the precipitation of the catalyst if desired. The average molecular weight of the mixture is about 230–235. The mixture of glycerol ethers may be separated into various fractions by distillation if desirable. The low boiling fractions are colorless while the high boiling fractions are brown, the color changing gradually as the distillation temperature rises. The mixture distills over a wide range between about 100° C. and about 260° C. at about 2–3 mm. pressure. The fraction boiling between about 100° C. and about

|   | Color | Average mol. wt. | Boiling range | Pressure | Principal glycols present |
|---|---|---|---|---|---|
| A | Colorless to light yellow | 215 | 167°–190° C | mm. 2.3 | Tetra- and penta-ethylene glycols. |
| B | ...do... | 277 | 195–215° C | 2.3 | Penta- and hexa-ethylene glycols. |
| C | Brown | 363 | Residue | | Hexa-, hepta- and octa-ethylene glycols. |

Some of the color may be removed by agitation with decolorizing carbon and filtration.

150° C. does not contain much combined ethylene oxide and may be separated from the remainder which contains from about 2-8 mols of ethylene oxide combined per mol of glycerol. The fraction boiling above about 150° C. may be separated by distillation or otherwise into smaller fractions having various average molecular weights between about 200 and about 340.

Example 7

Triethylene glycol and ethylene oxide are reacted in the same general manner as described in Example 2 and the catalyst is separated as described in Example 4. The following table shows the proportions of reactants and catalyst as well as the properties of the resulting products:

|   | Parts of triethylene glycol | Parts of ethylene oxide combined | Parts of stannic chloride | Average mol. wt. calculated from hydroxyl determination | Average No. $C_2H_4O$ units per molecule |
|---|---|---|---|---|---|
| 1 | 2000 | 2116 | 20 | 294 | 6.3 |
| 2 | 2000 | 2136 | 20 | 296 | 6.3 |
| 3 | 1650 | 2542 | 27 | 375 | 8.1 |
| 4 | 1275 | 3026 | 29 | 440 | 9.6 |
| 5 | 1050 | 2501 | 31 | 526 | 11.6 |

Example 8

242 parts (5 mols) allyl alcohol and about 3 parts of stannic chloride are cooled to 5°–10° C. in a suitable reaction chamber. About 290 parts (5 mols+about 10% excess) of liquid ethylene oxide are added slowly with agitation. After the reaction is complete the catalyst is removed and the product dried as described in Example 4. The resulting product is substantially water white. It may be distilled if desired, to give the following fractions:

|   | Distillation temperature | Pressure | Average molecular weight (calculated from hydroxyl value) |
|---|---|---|---|
|   | °C. |   |   |
| 1 | 100 | Atmos. | ----- |
| 2 | 162 | ---do--- | 104 |
| 3 | 65 | 1 mm | 141.5 |
| 4 | 93 | 1 mm | 190 |

Example 9

290 parts (5 mols) of allyl alcohol and about 485 parts (10 mols+about 10% excess) of liquid ethylene oxide are reacted in the presence of about 3 parts of stannic chloride in the same way as described in Example 8. The product may be purified by the procedure of Example 4 to give a water white or pale yellow product.

The reactions illustrated above may be carried out using other organic hydroxyl compounds including monohydric alcohols, dihydric alcohols, the higher polyhydric alcohols such as polyglycerol, and phenols. Among these compounds are: methanol, ethanol, propanol, butanol, cyclohexanol, octanol, dodecanol, benzyl alcohol, ethylene glycol, diethylene glycol, propylene glycol, butylene glycols, octadecanediol, glycerol, glycerol mono- and diethers, glycerol mono- and diesters, the higher glycols such as tetraethylene glycol, phenol, cresol, naphthol, etc.

Similarly any of the alkylene oxides may be substituted for ethylene oxide such as propylene oxide, butylene oxide, cyclohexene oxide, etc.

It has been found that only small proportions of stannic chloride are necessary to catalyze the reactions efficiently. Accordingly from about ½% to 5% (based on the weight of alcohol or the weight of alkylene oxide to be reacted) of catalyst is generally sufficient. Usually about 1% of catalyst is preferred.

Any suitable reaction temperature may be employed. It has been found that the reaction between the alkylene oxide and the hydroxy compound will take place at relatively low temperatures, e. g. just somewhat below room temperatures but obviously the reaction will proceed more rapidly at temperatures higher than room temperature. Accordingly it is desirable to use the highest reaction temperature which is possible without the loss of large proportions of either the alcohol or the alkylene oxide by volatilization.

While it is generally more convenient to conduct the reaction at atmospheric pressure, it is also possible to operate the process at pressures above atmospheric in order to reduce the losses by volatilization and/or to increase the proportion of combined alkylene oxide.

Many useful products may be prepared by means of the reactions described above and the resulting products find wide application as solvents, as reactants in the preparation of alkyd resins, etc. Mixtures of polyethylene glycols such as those prepared according to Examples 2, 5, and 7 are particularly suitable for the preparation of flexible resins. Similarly the glycerol ethers such as those prepared according to Examples 1 and 6 find use in preparation of flexible resins. Allyl ethers such as those prepared according to Examples 8 and 9 find use in the modification of various resinous materials.

Obviously many modifications in the processes described above may be made without departing from the spirit and scope of the invention as defined in the appended claims.

I claim:

1. A process of producing simple ethers of triethylene glycol which comprises adding ethylene oxide slowly to triethylene glycol in the presence of stannic chloride at about 25–35° C. and at atmospheric pressure and subsequently raising the temperature to about 45° C. to complete the reaction and maintaining the temperature at 45° C. for about one-half hour.

2. A process of producing substantially pure simple ethers of triethylene glycol which comprises adding ethylene oxide slowly to triethylene glycol in the presence of stannic chloride catalyst at temperatures of about 25–35° C., subsequently raising the temperature to about 45° C., maintaining the temperature at 45° C. for about one-half hour, mixing the product thus formed with about one-fourth to an equal volume of water, thereby precipitating the catalyst as flocculent tin hydroxide, separating the tin hydroxide from the mixture and removing the water present in the mixture.

LEONARD P. MOORE.

CERTIFICATE OF CORRECTION.

Patent No. 2,253,723.                                    August 26, 1941.

LEONARD P. MOORE.

It is hereby certified that error appears in the printed specification of the above numbered patent requiring correction as follows: Page 1, first column, Example 3, in the table, under the heading "Pressure mm.", for "2.3" both occurrences, read -- 2-3 --; and that the said Letters Patent should be read with this correction therein that the same may conform to the record of the case in the Patent Office.

Signed and sealed this 30th day of September, A. D. 1941.

(Seal)                                                                 Henry Van Arsdale,
                                                                        Acting Commissioner of Patents.